US005991781A

United States Patent [19]

Nielsen

[11] Patent Number: 5,991,781
[45] Date of Patent: Nov. 23, 1999

[54] METHOD AND APPARATUS FOR DETECTING AND PRESENTING CLIENT SIDE IMAGE MAP ATTRIBUTES INCLUDING SOUND ATTRIBUTES USING PAGE LAYOUT DATA STRINGS

[75] Inventor: Jakob Nielsen, Atherton, Calif.

[73] Assignee: Sun Microsystems, Inc., Palo Alto, Calif.

[21] Appl. No.: 08/722,757

[22] Filed: Sep. 27, 1996

[51] Int. Cl.[6] .................................................. G06F 17/21
[52] U.S. Cl. ................................................................ 707/513
[58] Field of Search ........................... 707/513; 434/114, 434/450; 340/825.19; 345/349

[56] References Cited

U.S. PATENT DOCUMENTS

| | | | |
|---|---|---|---|
| 5,186,629 | 2/1993 | Rohen | 434/114 |
| 5,223,828 | 6/1993 | McKiel, Jr. | 340/825.19 |
| 5,287,102 | 2/1994 | McKiel, Jr. | 340/825.19 |
| 5,721,851 | 2/1998 | Cline et al. | 345/349 |
| 5,727,950 | 3/1998 | Cook et al. | 434/450 |

FOREIGN PATENT DOCUMENTS

| | | | |
|---|---|---|---|
| 0604340 A1 | 6/1994 | European Pat. Off. | G06F 17/21 |
| 2317070 | 3/1988 | United Kingdom | G06F 17/21 |

OTHER PUBLICATIONS

"Inline Images: External Images, Sounds and Animations." A Beginner's Guide to HTML. Document on–line. Available from http://www.physics.iastate.edu//numaps/96/references/htmlprimer.html; Internet; accessed Aug. 10, 1997. pp. 16–20, Apr. 1996.

Tittel, Ed and Steve James. "HTML for Dummies" 2d ed. (Foster City: IDG Books Worldwide, Inc. 1996) pp. 3, 28, 31, 32, 100, 101, 157, 187–193, 213–215, 231, Mar. 11, 1996.

T. V. Raman, "Emacspeak — A Speech Interface", Apr. 13, 1996, Common Ground, Chicago '96 Conference Proceedings, Conference on Human Factors in Computing Systems, Vancouver, Apr. 13–18, 1996, pp. 66–71.

M. Krell et al., "V–Lynx: Bringing the World Wide Web to Sight Impaired Users", Apr. 11, 1996, Assets '96, 2nd Annual Conference on Assistive Technologies, Vancouver, Apr. 11–12, 1996, Nr. Conf. 2, pp. 23–26.

A. R. Kennel, "Audiograf: A Diagram–Reader for the Blind", Apr. 11, 1996, Assets '96, 2nd Annual Conference on Assistive Technologies, Vancouver, Apr. 11–12, 1996, Nr. Conf. 2, pp. 51–56.

Database WPI: Section EI, Weed 9636, Derwent Publications Ltd., London, GB; Class T01, AN 96359991, XP002074768; & JP 08 171 647 A (Hitachi Ltd), Jul. 2, 1996; & US 5,715,412 (Abstract).

*Instant HTML Web Pages,* by Wayne Ause, Ziff–Davis Press, ISBN 1–56276–363–6, 1995, pp. 1–15.

Uniform Resource Locator (URL), Berners–Lee, Masinter & McCahill, Dec. 1994, pp. 1–25, (http://www.cis.ohio-state.edu/htbin/rfc/rfc1738.html).

"Extensions to HTML 3.0", Netscape Communication Corporation, 1996, pp. 1–4, (http://home.netscape.com/assist/net_sites/html_extensions_3.html).

"A Proposed Extension to HTML: Client–Side Image Maps", J. Seidman, Spyglass, Inc., Aug. 1996, pp. 1–7 (ftp://ds.internic.net/rfc/rfc1980.txt).

"HTML 3.2 Features at a Glance", 7 pages, (http://www.w3.org/pub/WWW/MarkUp/Wilber/features.html).

"Hypertext Markup Language — 2.0", rfc1866, pp. 1–77, (http://www.cis.ohio-state.edu/htbin/rfc/rfc1866.html).

*Primary Examiner*—James P. Trammell
*Assistant Examiner*—John Leonard Young
*Attorney, Agent, or Firm*—McDermott, Will & Emery

[57] ABSTRACT

Apparatus, methods, systems and computer program products are disclosed that provide enhancements to client-side image maps in HTML based documents. These enhancements provide audio feedback to a user of a HTML capable application as to the hyperlinks associated with an area in an image. These enhancements also provide a visual representation of the areas defined by a client-side image map when the image is not available.

60 Claims, 13 Drawing Sheets

METHOD AND APPARATUS FOR DETECTING AND PRESENTING CLIENT SIDE IMAGE MAP ATTRIBUTES INCLUDING SOUND ATTRIBUTES USING PAGE LAYOUT DATA STRINGS

BACKGROUND OF THE INVENTION

1. Field of the Invention

This invention relates to the field of presenting data streams constructed using a hypertext markup language (HTML). Specifically, this invention is a new and useful method, apparatus, system and computer program product for enhancing the operation of client-side image maps for those who cannot see the displayed image or for those who do not desire to download the image.

2. Background

Because most of the information provided to sighted computer users consists of visual information provided on a computer monitor, the visually impaired or blind computer user works under a significant disadvantage. This same disadvantage applies to users who are remotely operating a computer using a keypad but without a visual display, such as a telephone. For the visually impaired the computer monitor is a featureless expanse of glass or plastic that is unlike paper media that can provide a change in texture so that the blind can tactically read the change in texture (such as Braille). Screen-readers enable computer access to visually impaired users. Screen-readers are well known in the art and convert the text displayed on a computer screen into a sound that mimics spoken language. In other words, the computer reads the displayed text to the user. However, the information presented to the user must be in textual form. These devices work well when textual information is presented on the computer. However, these devices are very limited when graphical information is presented. The technology does not yet exist that allows a computer to describe an image displayed on a monitor. Traditionally this limitation has not significantly affected the visually impaired because, until recently, most information presented on computer monitors has been textual based. However, with the explosion of the World Wide Web (WWW), graphical information is being widely used to carry information content. Thus, visually impaired computer users find it difficult to navigate the WWW.

World Wide Web

The WWW is a massive hypertext system that a user accesses using a WWW browser application executing on a computer—an information access apparatus. The WWW browser apparatus communicates with, and is a client of, information provider apparatus such as server computers each executing server applications capable of communicating with the client browser application. These clients obtain information and services, in the form of web pages, from the server. These web pages are identified by unique universal resource locators (URL) and are usually specified using a markup language—generally a version of the hypertext markup language (HTML). HTML 2.0, is described in RFC1866 and can be found on the WWW at: "http://www.cis.ohio-state.edu/htbin/rfc/rfc1866.html" and is hereby incorporated by reference as illustrative of the prior art. However, HTML is evolving and variants exist. For example, the HTML 3.2 proposal is found at "http://www.w3.org/pub/WWW/MarkUP/Wilbur/features.html", and a proposed HTML extension that describes client-side image maps is found at "http://home.netscape.com/assist/net_sites/html_extensions_3.html" and by RFC1980 found at "ftp://ds.internic.net/rfc/rfc1980.txt".

The background of the WWW, WWW browser applications, and URLs are well described by reference to the first chapter of *Instant HTML Web Pages,* by Wayne Ause, Ziff-Davis Press, ISBN 1-56276-363-6, copyright 1995, pages 1–15, hereby incorporated by reference as illustrative of the prior art. The URL specification, also incorporated by reference, is described in RFC1738 and can be found on the WWW at: "http://www.cis.ohio-state.edu/htbin/rfc/rfc1738/html". Briefly, the URL contains a protocol specification and a path specification. The protocol specification notifies the browser of what protocol to use when accessing the remote server. The path specification is generally a hierarchical path that specifies a data server followed by a hypernode (such as a web page) that actually provides the information for the browser.

FIG. 1*a* illustrates an example client-server information access system implemented using a plurality of computers. An information client system 101 communicates over a network 103 such as the internet 103 to a plurality of information server systems 105. The client system 101 encapsulates requests for services and information within an applicable internet protocol and passes the encapsulated requests to the internet 103 as indicated by an arrow 107. The internet 103 routes these requests to each of the plurality of information server systems 105 addressed within the request as indicated by a plurality of arrows 109. Each of the plurality of addressed information server systems 105 respond to the client system 101 with responses appropriate to the service or information requested by the client system 101. Once the client system 101 receives this information, it is presented to the user by using an application program (for example, a WWW browser) executing on the client computer.

Hypertext documents, composed of HTML data, can be presented to a user by an application. The application processes the HTML data contained within the document to generate an image that can be displayed to a user on a computer display or tangible page. Unlike page description languages, such as PostScript, the "page" layout of HTML documents is dependent on the drawing area used to display the image described by the HTML data. Thus, HTML is used to describe hypertext documents that are portable from one computing platform to another and that do not require WYSIWYG functionality. The HTML concept is that of a scrolling page that can be resized as desired by the user.

FIG 1*b* illustrates a web page 151 that uses a mapped image to indicate hyperlinks to other information. The web page 151 has a background 153, a first selectable control area (SCA) 155, a second SCA 157 and a third SCA 159. One skilled in the art will understand that the first SCA 155, the second SCA 157 and the third SCA, need not be distinguishable from the background 153, although generally the SCAs 155, 157, 159 are visually distinct.

Sighted users navigate this web page by positioning a cursor over an SCA by manipulating a pointing device and activating the pointing device to invoke the associated web page. This approach to selecting information is difficult for visually impaired users because they cannot see where to position the cursor on the image.

The visually impaired user accesses a web page, such as that in FIG. 1*b*, by using leap keys to move a cursor. Leap keys are often assigned as the up, down, left and right arrow keys. Often these leap keys have the following functions: the up key causes the parent page of the currently displayed page to be displayed; the down key causes activation of the currently selected URL and typically results in a child page of the current page to be displayed; the left key causes the cursor to backup to the previous SCA on the current page; and the right key causes the cursor to advance to the next SCA on the current page. Each of these leap keys cause an auditory message to be played to the user that provides information as to where the cursor is in the Web Page. The auditory message is often the text displayed by the hyperlink's URL. Thus, if URL was "http://www.sun.com/", the auditory message would be the following spoken words: "H T T P colon slash slash W W W dot Sun dot Com slash".

Another aspect of WWW browser applications is that they often maintain a database of recently accessed hyperlinks. These recently accessed links are displayed in a different color from links that have not been accessed.

Server-side image maps operate by sending the selected coordinates with respect to the displayed image to a process identified by a URL. This process then determines what action is to be associated with the selected coordinate and performs that action. Thus, although a particular image may have multiple selectable areas, the client does not have the information needed to directly invoke an action and does not receive any feedback about the selectivity of an area.

Client-side image maps operate by associating a map of areas to the image map. The map provides facilities for specifying a shape at a given coordinate of the image. This area is also associated with a reference (a URL) that allows the client to directly invoke the reference when the user selects an area. The area also may contain an "ALT" attribute that contains text that describes the containing area. This text is used with text-only WWW browsers (or browsers that do not automatically download images) as a substitute for the areas of the image. The ALT attribute is also used when the prior art cannot display the image. Among others, this condition occurs when the image is not available to the WWW browser, such as when the image-loading facility of the browser is turned off, when the image is unable to be retrieved from the server, or when the user has stopped the image download by invoking the stop download command (usually by activating the browser's stop download SCA).

Users of WWW browser facilities who are connected to the internet through analog phone lines often turn off the image capability of the browser so that the time required to display web pages is reduced (because the data intensive images are not transmitted to the application). This operating mode allows those who do not desire to view the images to more quickly navigate the WWW. A problem with this mode of operation is that the structure of client-side image maps is also not displayed. Thus, a client side image map only displays the ALT attribute in the <AREA> element (if provided) without any spatial information as to the shape, size, and arrangement of the <AREA> elements.

Another problem with client-side image maps is that many users disable the presentation of graphical information when browsing the WWW because these images take significant amounts of time to download. This problem is exacerbated by low speed data links or if too many users share a high-speed digital connection. Thus, users often browse the WWW with image loading disabled until they reach an interesting web page. The problem with this approach to browsing the WWW is that client-side image maps have user selectable control areas (SCAs). Without the image, the position, shape, and structure of the SCAs associated with the image are not apparent even if the hyperlink is displayed Speech Synthesis and Audio Playback Speech synthesis systems such as the DECtalk® and Macintalk® facilities convert textual strings into sounds that mimic human speech. These facilities are well known in the art. Further, sound reproduction facilities are also well known in the art and are used to play reproduce information stored in digital form into sound.

Thus, there is a need to extend image map capabilities to better operate when the images associated with the image map are not available for viewing.

SUMMARY OF THE INVENTION

The present invention provides an economical, apparatus, method, system and computer program product for providing enhanced facilities to users of client-side image maps. One aspect of the invention is a computer controlled method for human-computer interactions. The method detects an image map that is associated with an image. This image map has an audio attribute associated with a selectable area of the image. The method also detects a preselection condition on the selectable area of the image. The method then presents a sound associated with the audio attribute through a sound production facility.

In another aspect of the invention, an information display system is disclosed for enhancing human-computer interactions. This system includes an image map detection mechanism. The image map detection mechanism detects an image map that is associated with an image. The image map detection mechanism has an audio attribute associated with a selectable area of the image. The system also includes a preselection condition detection mechanism that is configured to detect a preselection condition on the selectable area in the image. Additionally, the system includes a sound presentation mechanism configured to present a sound through a sound production facility upon detection of the preselection condition. The sound is associated with the audio attribute of the selectable area.

In yet another aspect of the invention an apparatus for enhancing human-computer interactions is disclosed. The apparatus has a CPU and a memory. The apparatus also has an image map detection mechanism, a preselection condition detection mechanism, and a sound presentation mechanism having the same functions as the system described above.

Another aspect of the invention is a computer program product on a computer usable medium for causing a computer to provide enhanced human-computer interactions. When executed on the computer, the computer readable code causes a computer to effect an image map detection mechanism, a preselection condition detection mechanism, and a sound presentation mechanism having the same functions as the system described above.

Additionally, another aspect of the invention is a computer controlled method of enhancing human-computer interactions by first detecting an image map associated with an image area. The method also detects a height attribute and a width attribute for the image area. The method then displays a border around the image area. This border has a status representation, and the image map specifies at least one selectable area in the image area.

The description of the invention also discloses an information display system for enhancing human-computer interactions. This system includes an image map detection mechanism that is configured to detect an image map associated with an image area. The system also includes an image size detection mechanism that is configured to detect a height attribute and a width attribute for the image area. Additionally, the system includes a border displaying mechanism configured to display a border around the image area, the border having a status representation and the image map specifying at least one selectable area in the image area.

Another aspect of the invention is an information display apparatus for enhancing human-computer interactions having a central processing unit (CPU) and a memory. This aspect of the invention includes an image map detection mechanism that is configured to detect an image map associated with an image area. The apparatus also includes an image size detection mechanism that is configured to detect a height attribute and a width attribute for the image area. Additionally, the apparatus includes a border displaying mechanism configured to display a border around the image area, the border having a status representation and the image map specifying at least one selectable area in the image area.

Yet a further aspect of the invention is a computer program product embedded on a computer usable medium for causing a computer to provide enhanced human-computer interactions. When executed on a computer, the computer readable code causes a computer to effect an image map detection mechanism that is configured to detect an image map associated with an image area. The computer readable code also causes a computer to effect an image size detection mechanism that is configured to detect a height attribute and a width attribute for the image area. Additionally, the computer readable code causes a computer to effect a border displaying mechanism configured to display a border around the image area, the border having a status representation, and the image map specifying at least one selectable area in the image area.

The foregoing and many other objects and advantages of the present invention will no doubt become obvious to those of ordinary skill in the art after having read the following detailed description of the preferred embodiments which are illustrated in the various drawing figures.

DESCRIPTION OF THE PREFERRED EMBODIMENTS

Notations and Nomenclature

Figure 1A:
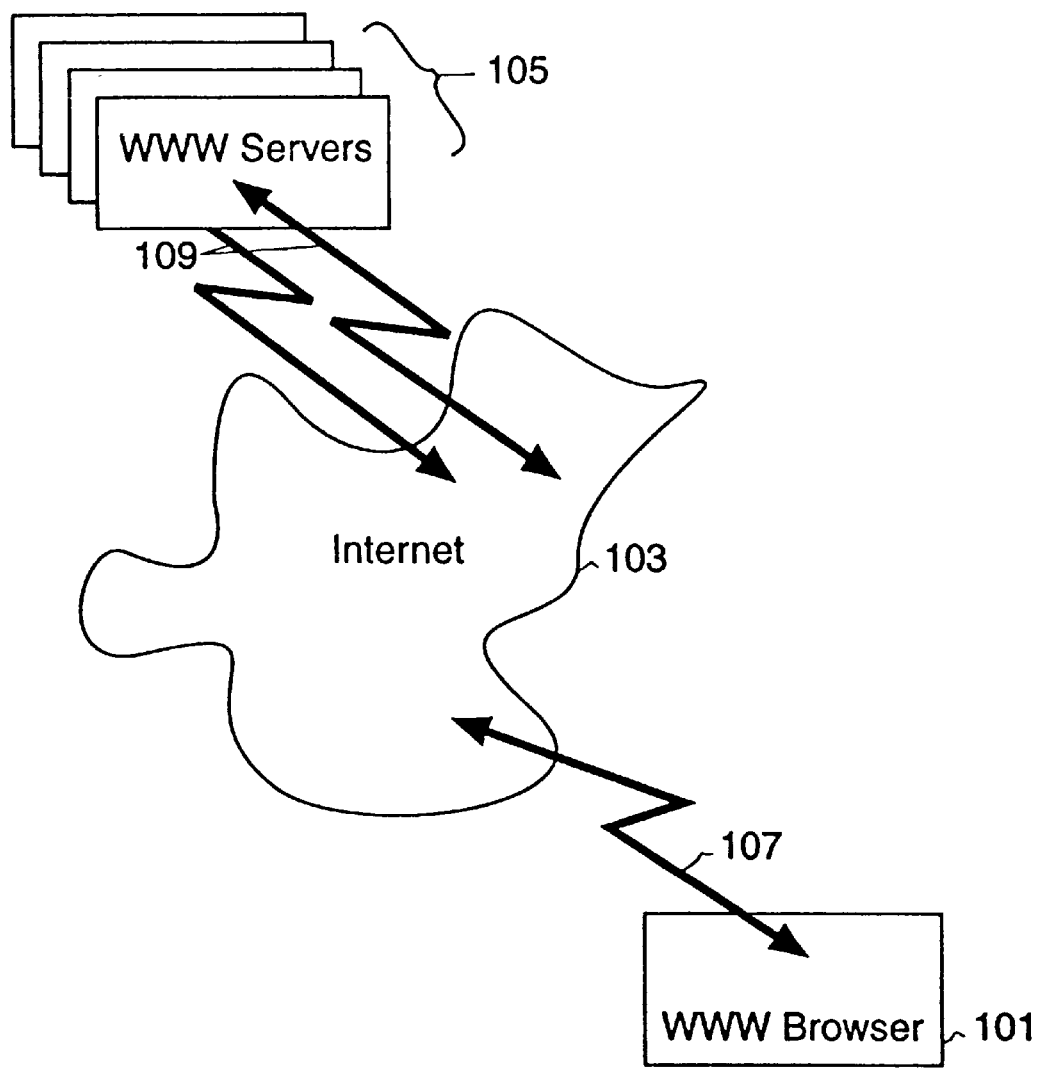
FIG. 1a illustrates an example client-server information access system implemented using a plurality of computers.

The following "notations and nomenclature" are provided to assist in the understanding of the present invention and the preferred embodiments thereof.

Cursor—A device on a computer display that indicates what portion of the computer display is of interest to a user. A cursor can be positioned by a pointing device, by operation of leap keys or other methods well understood in the art. The cursor indicates where an activation will be applied.

Relevant Active Area—An area defined by an image map, within the area of an image, that includes an audio attribute.

Preselection condition—A condition where a cursor has continuously been in an area defined by an image map for a specified period of time.

Graphical User Interface (GUI)—A user interface that allows a user to interact with a computer display by pointing at selectable control areas on the display and activating a command or computer operation associated with the selectable control area. GUIs are well known in the art.

Pointing device—A device that is responsive to a computer user's input that moves an indicator (a form of cursor) on a computer display screen. Such an indicator has an active point such that if the pointing device is activated (for example, by a button push for a mouse device) a command associated with the selectable control area covered by the active point is invoked. Pointing devices are generally used with graphical user interfaces.

Selectable control area (SCA)—An area on a computer display that is sensitive to activation of a pointing device. On activation of the pointing device over the selectable control area, a command or computer operation associated with the selectable control area is invoked. Most computer systems that provide a Graphical User Interface (GUI) also provide other methods for invoking these commands or computer operations such as keyboard function keys or command lines.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (for example, mechanical, chemical) physical signals to generate other desired physical signals.

The invention also relates to an apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

Figure 2:
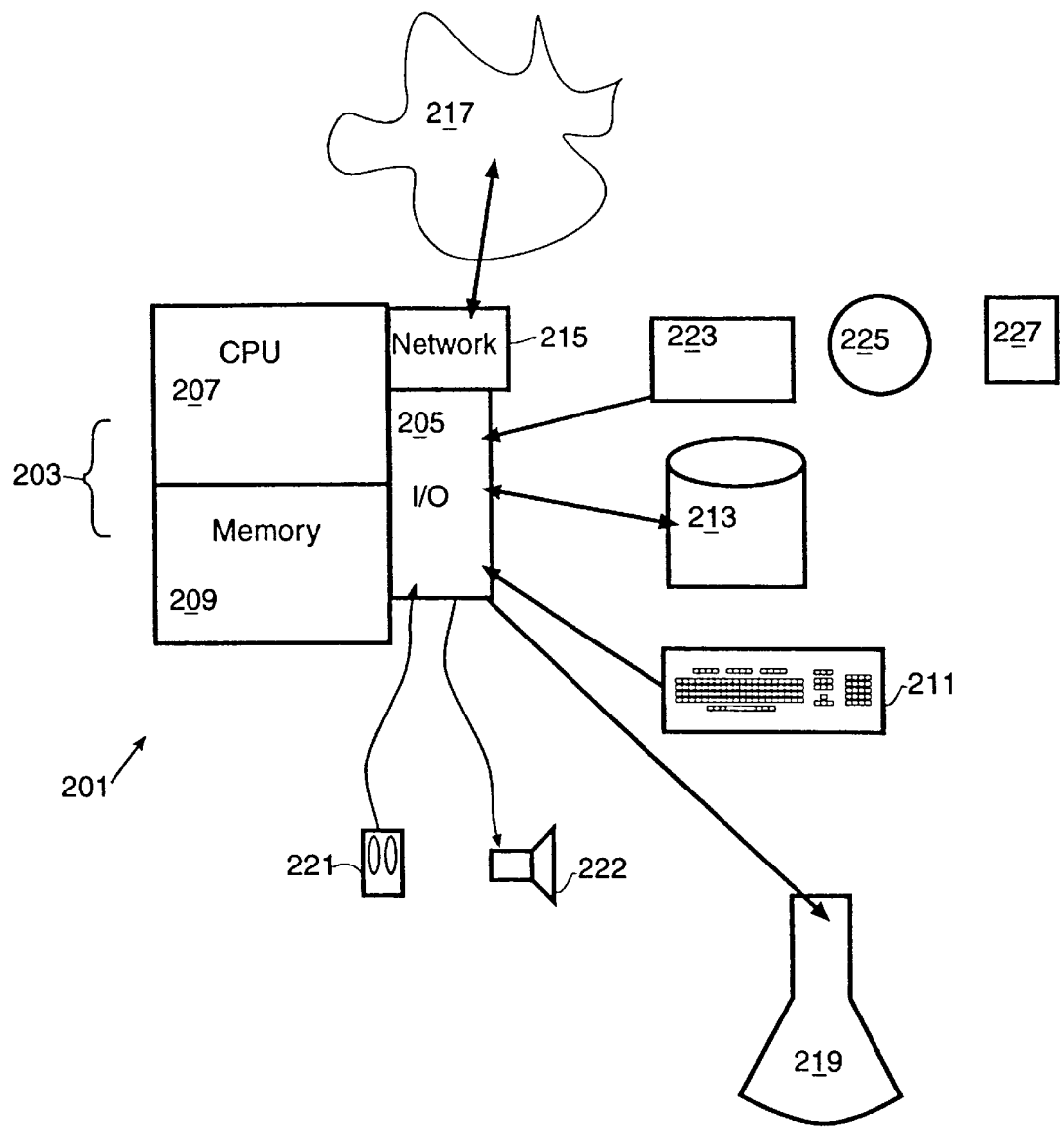
FIG. 2 illustrates a computer configured to support the invention in accordance with a preferred embodiment of the invention.

Some of the elements of a computer system, referred to by a general reference character 201, configured to support the invention are shown in FIG. 2 wherein a processor 203 is shown, having an Input/Output ("I/O") section 205, a central processing unit ("CPU") 207 and a memory section 209. The I/O section 205 is connected to a keyboard 211, a disk storage unit 213, a network interface 215 to provide access to a network 217, a display unit 219, a pointing device 221, a sound production facility 222, and a CD-ROM drive unit 223. The CD-ROM unit 223 can read a CD-ROM medium 225 that typically contains programs and data 227. The CD-ROM unit 223 (using the CD-ROM medium 225) and the disk storage unit 213 comprise a filestorage mechanism. Such a computer system is capable of executing information display applications that embody the invention.

One skilled in the art will understand that the invention described herein does not depend on the existence of a client-server information access mechanism, similar to the one illustrated in FIG. 1a, because information to be displayed to a user often resides on the same computer that accesses the information. For the same reason, the invention does not require the network interface 215 or access to the network 217. Rather, the invention is directed toward presenting HTML information to a user of a computer controlled display device independent of the source of the information. The computer system illustrated by FIG. 2 is capable of executing WWW browser applications that embody the invention.

Image Map Specification

The client-side image map facility allows the web page author to provide a definition of the SCAs on the image as well as what action the browser should take when the area is selected. Table 1 illustrates the HTML markup used to describe such an image map according to the RFC1980 specification referred to above.

TABLE 1

```
<MAP NAME="nav1bar">
    <AREA SHAPE="RECT" COORDS="0,0,60,30"
        HREF="http://www.sun.com/"
        ALT="Sun Microsystem's Home Page">
    <AREA SHAPE="RECT" COORDS="61,0,500,30"
        HREF="/current/columns/alertbox"
        ALT="Jakob's Alert Box column">
```

TABLE 1-continued

```
    <AREA SHAPE="RECT" COORDS="501,0,579,30"
        HREF="search.html"
        ALT="search">
</MAP>
```

After defining the selectable areas in the image map as shown in Table 1, the web page author associates the map with a specific image using HTML markup similar to:

```
<IMG SRC="/share/images/nav1bar.gif" USEMAP="#nav1bar">
```

If image display is enabled in the browser, this HTML markup causes the display of an image defined by nav1bar.gif. The display of this image has three selectable areas. If image display is not enabled in the browser, the <AREA> element ALT attributes are displayed. The invention provides the facility to speak the text contained in the ALT attributes when an area is in a preselection condition regardless of whether the image is displayed. A preselection condition occurs when the cursor is positioned over an area of the image for a sufficient period of time without the cursor being activated (thus, the area is not yet selected). For example, after the user's cursor has entered the area of the image map delimited by the rectangle 0,0,60,30 and has remained in the area for a sufficient period of time, the browser passes the ALT text "Sun Microsystem's Home Page" to a speech synthesis facility that produces a sound. Thus, the user can hear a statement relating to the possible activation of the cursor—in this instance the words "Sun Microsystem's Home Page".

Audio Image Map—ALT Operation

Figure 3:
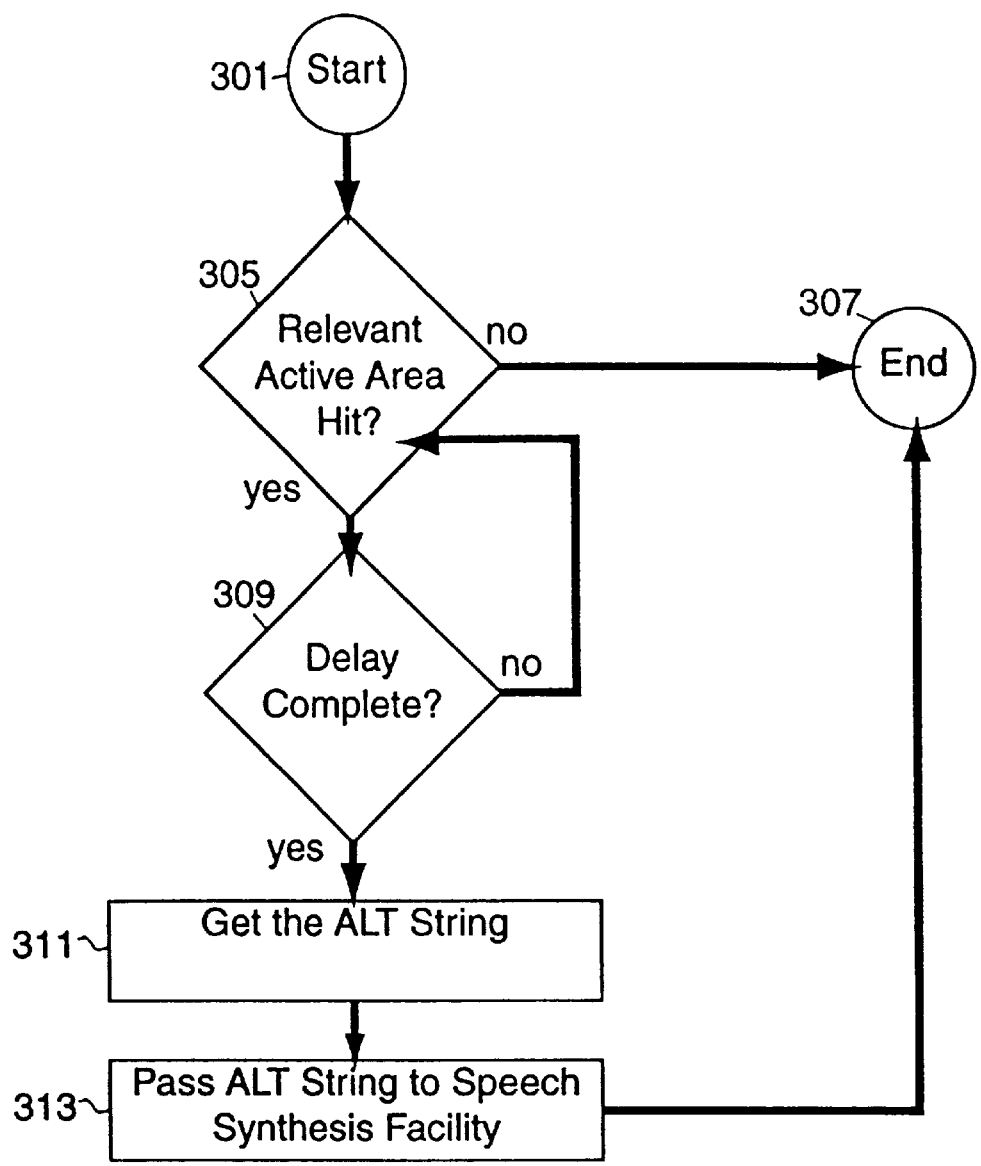
FIG. 3 illustrates the process used to practice the invention using the ALT attribute in accordance with a preferred embodiment.

FIG. 3 illustrates the process used in the preferred embodiment of the invention supporting the HTML image map facility as defined in RFC1980. When the WWW browser program detects that a cursor has moved within the image of a client-side image map the WWW browser program invokes the process at a "Start" terminal 301. Next, at a "Relevant Active Area Hit" decision procedure 305 the process determines whether the cursor is within a selectable area defined by the image map and if that area is associated with an audio attribute. In a preferred embodiment, the audio attribute is the ALT attribute. In particular, the coordinates of the cursor are compared to the areas defined for the image according to the image map. If the cursor is within one of the defined areas of the image map, and if that area includes an audio attribute, a hit has occurred in a relevant active area. If the cursor is not positioned within a relevant active area of the image map, the process completes through an "End" terminal 307, and the WWW browser program continues its normal processing.

However, if at the "Relevant Active Area Hit" decision procedure 305 the cursor is detected to be within a relevant active area of the image map, the process continues to a "Delay Complete" decision procedure 309 that detects that the cursor has remained within the relevant active area over a sufficient period of time (the delay time) to create a preselection condition. If the cursor has not been within the relevant active area for a sufficient period of time, the preselection condition is not satisfied and the process continues to the "Relevant Active Area Hit" decision procedure 305.

However, if the cursor remained within the relevant active area for a sufficient period of time (the delay period can be a user preference item), the preselection condition is satisfied, and the process continues to a "Get the ALT String" procedure 311. This procedure 311 extracts the string defined by the ALT attribute in the <AREA> element of the relevant active area of the image map associated with the image. Once the string is obtained, a "Pass ALT String to Speech Synthesis Facility" procedure 313 invokes the computer's speech syntheses facility to convert the string to a sound presented by the computer. Finally, the process returns through the "End" terminal 307.

The blind user is informed that the cursor is within a selectable area of an image and can then select the area. Sighted users also benefit by receiving audio feedback describing the area under the cursor, if desired, especially if the image is difficult to interpret.

Audio Image Map—SOUND Operation

Figure 4:
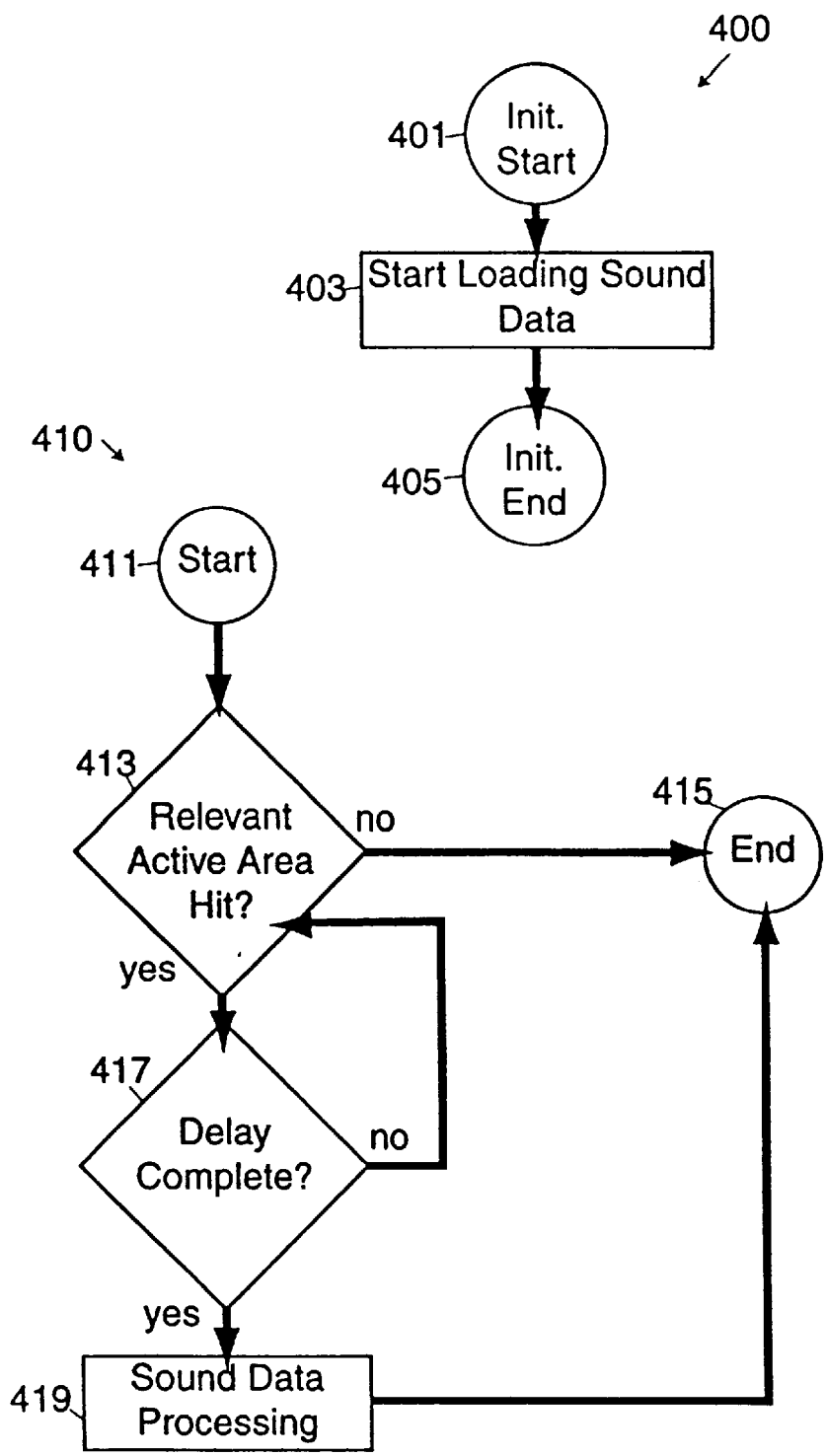
FIG. 4 illustrates process used to practice the invention using a SOUND attribute in accordance with a preferred embodiment.

FIG. 4 illustrates another embodiment of the invention. This embodiment adds an additional attribute to the <AREA> element—the SOUND attribute. Use of the SOUND attribute causes prerecorded audio data to be played to the user instead of using a speech synthesizer to convert text to sound. This capability is invoked by adding a SOUND attribute to the <AREA> element. The SOUND attribute specifies a URL that returns digitized audio data. This data is accessed by the WWW browser and played to the user when an area becomes preselected. Modifying the <MAP> element of Table 1 above to utilize a SOUND attribute for the rectangle at 61, 0, 500, 30 results in the <MAP> element of Table 2 below. One skilled in the art will understand that the attribute can be defined by numerous character strings with the equivalent effect.

TABLE 2

```
<MAP NAME="nav1bar">
<AREA SHAPE="RECT" COORDS="0,0,60,30"
    HREF="http://www.sun.com/"
    ALT="Sun Microsystem's Home Page">
<AREA SHAPE="RECT" COORDS="61,0,500,30"
    HREF="/current/columns/alertbox"
    SOUND="/columns/alertboxsound.au">
<AREA SHAPE="RECT" COORDS="501,0,579,30"
    HREF="search.html"
    ALT="search">
</MAP>
```

The process used to initialize access to the <AREA> element SOUND capabilities, referred to by a general reference character 400, is initialized by the WWW browser, after the source HTML file and visually related support data have been downloaded. This initialization occurs through an "Init. Start" terminal 401. The process then continues to a "Start Loading Sound Data" procedure 403. This procedure 403 locates the SOUND attributes in the <AREA> elements of the HTML file and initiates loading of the audio data into memory where it is stored for timely access. This loading process generally involves downloading audio files from a server computer to the client computer and can take significant time. Further, the WWW browser application generally limits the number of audio files being simultaneously downloaded to manage the available bandwidth between the server computers and the client computer. The process then completes through an "Init. End" terminal 405. To remain responsive, this process loads the audio files in an asynchronous manner so that other initializations and WWW browser program operations can occur while the audio files are being obtained.

When the WWW browser program detects that a cursor has moved within the display of a client-side image map having a SOUND attribute, the WWW browser program invokes the sound play process, referred to by a general reference character 410, at a "Start" terminal 411. Next, at a "Relevant Active Area Hit" decision procedure 413 the process determines whether the cursor is within an area defined by the image map and whether that area is associated with an audio attribute—in this instance the SOUND attribute. In particular, the coordinates of the cursor are compared to the areas defined for the image according to the image map. If the cursor is within one of the defined areas of the image map, and if that area includes an audio attribute, a hit has occurred in a relevant active area. If the cursor is not positioned within a relevant active area of the image map, the process completes through an "End" terminal 415, and the WWW browser program continues its normal processing.

However, if at the "Relevant Active Area Hit" decision procedure 413 the cursor is detected to be within a relevant active area of the image map, the process continues to a "Delay Complete" decision procedure 417. This procedure 417 detects that the cursor has remained within the relevant active area over a sufficient period of time (the delay time) to create a preselection condition. If the cursor has not been within the relevant active area for a sufficient period of time, the preselection condition is not satisfied, and the process again moves to the "Relevant Active Area Hit" decision procedure 413.

However, if the cursor has remained within the relevant active area over a sufficient period of time (the delay time can be a user preference item), the preselection condition is satisfied, and the process continues to a "Sound Data Processing" procedure 419, described below in relation to FIG. 5, that presents the sound by playing the sound data associated with the relevant active area. Then the process completes through the "End" terminal 415.

Figure 5:
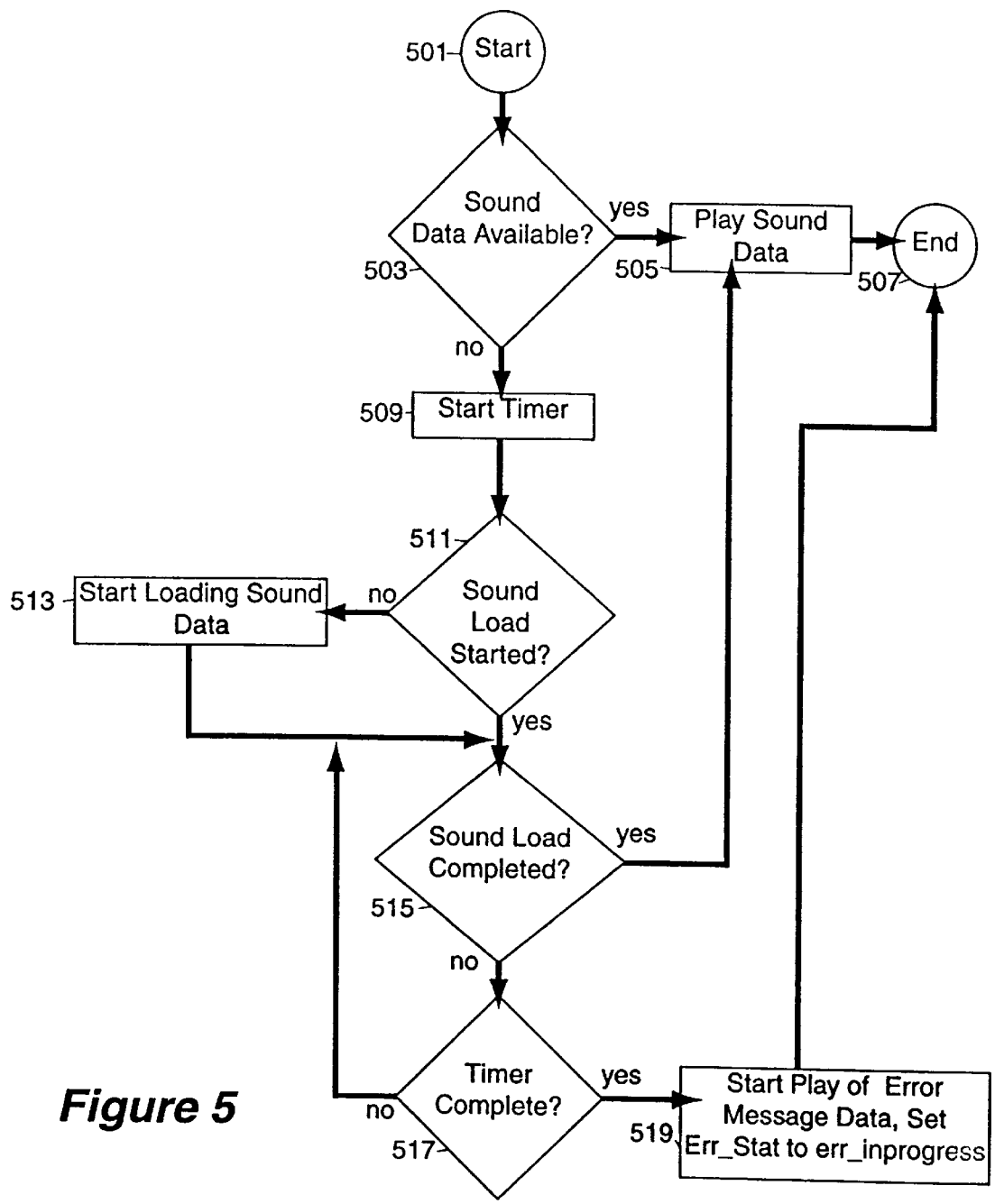
FIG. 5 illustrates the process used by the "Sound Data Processing" procedure in accordance with a preferred embodiment.

FIG. 5 illustrates the process used by the "Sound Data Processing" procedure 419 of FIG. 4. The process initiates through a "Start" terminal 501 and continues to a "Sound Data Available" decision procedure 503 that determines whether the sound data specified by the SOUND attribute of the hit <AREA> element is completely loaded into memory. If so, the process continues to a "Play Sound Data" procedure 505 that plays the sound data through the computer's sound production facility and then completes at an "End" terminal 507.

If the "Sound Data Available" decision procedure 503 determines that the sound data is not available, the process continues to a "Start Timer" procedure 509. The sound data is not available unless the entire sound file is available to the process. Thus, if the sound file has not been loaded into memory, or if the file has not been completely transferred to memory, the sound file is not available.

The "Start Timer" procedure 509 starts a timer (typically set to five (5) seconds, but in a preferred embodiment is a user preference). The process does not wait for the timer to complete. Instead, the process continues to a "Sound Load Started" decision procedure 511 that determines whether the loading of the sound file associated with the <AREA> has been initiated. If the loading of the sound file has not been initiated, the process continues to a "Start Loading Sound Data" procedure 513 that initiates loading the sound data into memory. In either case, the process continues to a "Sound Load Completed" decision procedure 515 that determines whether the sound data is completely in memory. If the sound data is completely in memory, the process continues to the "Play Sound Data" procedure 505 and completes through the "End" terminal 507. If the "Sound Load Completed" decision procedure 515 determines that the sound data is not yet completely loaded into memory, the sound data is unavailable, and the process continues to a "Timer Complete" decision procedure 517.

The "Timer Complete" decision procedure 517 determines whether the timer initiated in the "Start Timer" procedure 509 has run for the specified delay (period of time). If the timer has not completed, the process loops to the "Sound Load Completed" decision procedure 515. If the timer has completed at the "Timer Complete" decision procedure 517, the process continues to a "Start Play of Error Message Data . . . " procedure 519 that presents the error sound through the sound production facility.

The "Start Play of Error Message Data . . . " procedure 519 plays an audio error message through the computer's sound production facility. In a preferred embodiment, this audio error message is a voice saying "link definition not available", but the invention contemplates any sound being used for the error message. This procedure 519 also sets an Err_Stat variable to the value err_inprogress to indicate that the error sound is being played. Finally, the process completes through the "End" terminal 507.

Figure 6A:
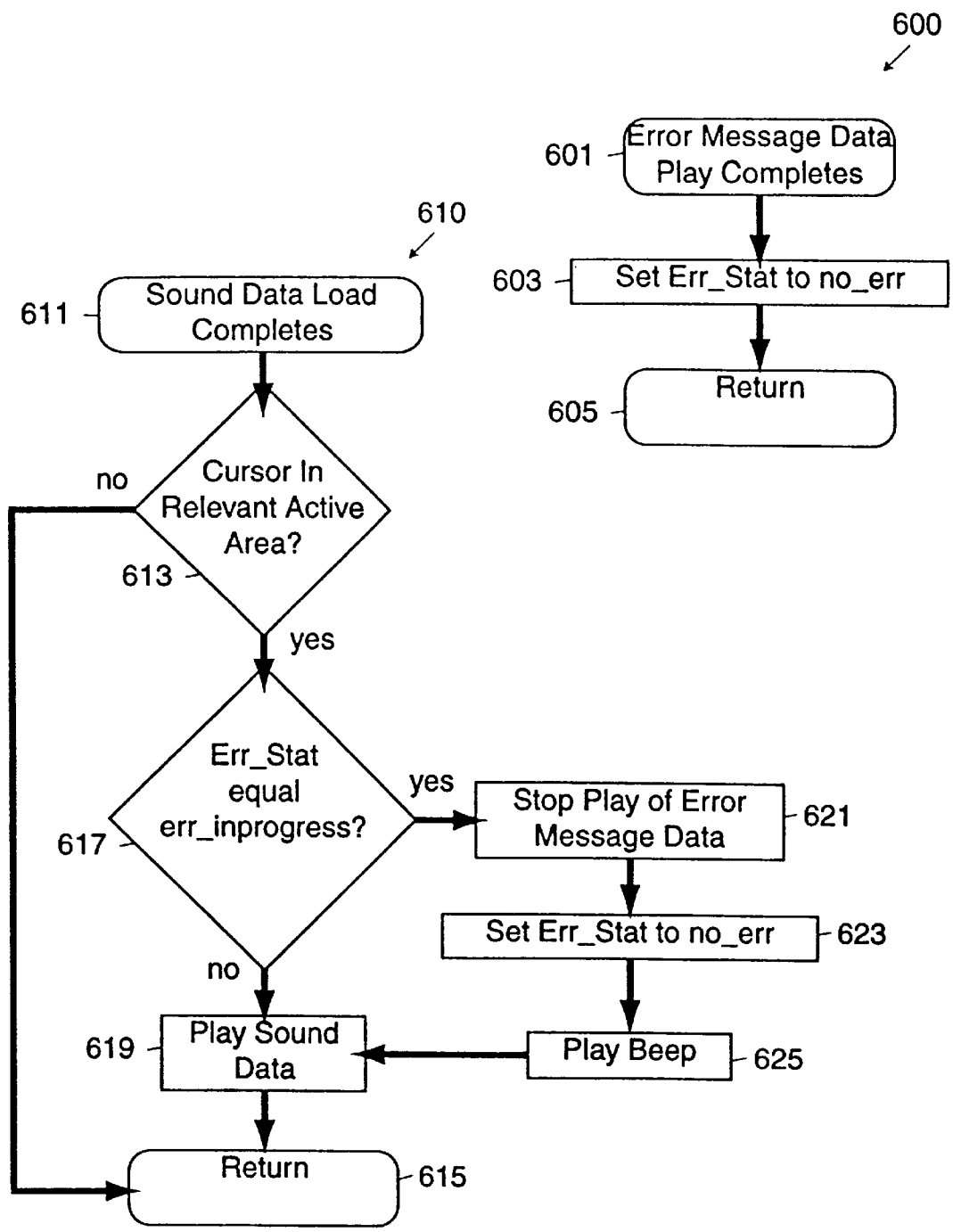
FIG. 6a illustrates asynchronous processes used to support presenting audio messages in accordance with a preferred embodiment.

The preferred embodiment incorporates asynchronous processes. These processes are illustrated in FIG. 6a. The first asynchronous process, referred to by a general reference character 600, starts responsive to an "Error Message Data Play Completes" condition 601. Then, at a calculation block 603 the process sets the Err_Stat variable to the value no_err to indicate that the error sound has completed. Finally, the asynchronous process completes at a "Return" 605.

The second asynchronous process, referred to by a general reference character 610, starts responsive to a "Sound Data Load Completes" condition 611 and continues to a "Cursor in Relevant Active Area" decision procedure 613. This decision procedure 613 determines whether the cursor is in the same <AREA> that defined the sound that just completed loading. If the cursor is not in the same <AREA>, the asynchronous process completes through a "Return" 615. However, if the cursor is in the same <AREA>, the process continues to a decision block 617 that determines whether the Err_Stat variable contains the value err_inprogress. If the Err_Stat variable does not contain the value err_inprogress, the process continues to a "Play Sound Data" procedure 619 that plays the newly loaded sound data. Then the asynchronous process completes through the "Return" 615. However, if the Err_Stat variable does contain the value err_inprogress, at the decision block 617 the process continues to a "Stop Play of Error Message Data" procedure 621 that terminates the play of the error message. Next, at a calculation block 623 the process sets the Err_Stat variable to the value no_err to indicate that the error message is no longer playing. The process then continues to a "Play Beep" procedure 625 that plays an alert sound to indicate that the error message has been interrupted. Next, the process continues to the "Play Sound Data" procedure 619 that plays the just loaded sound data. Finally, the asynchronous process completes through the "Return" 615.

Figure 6B:
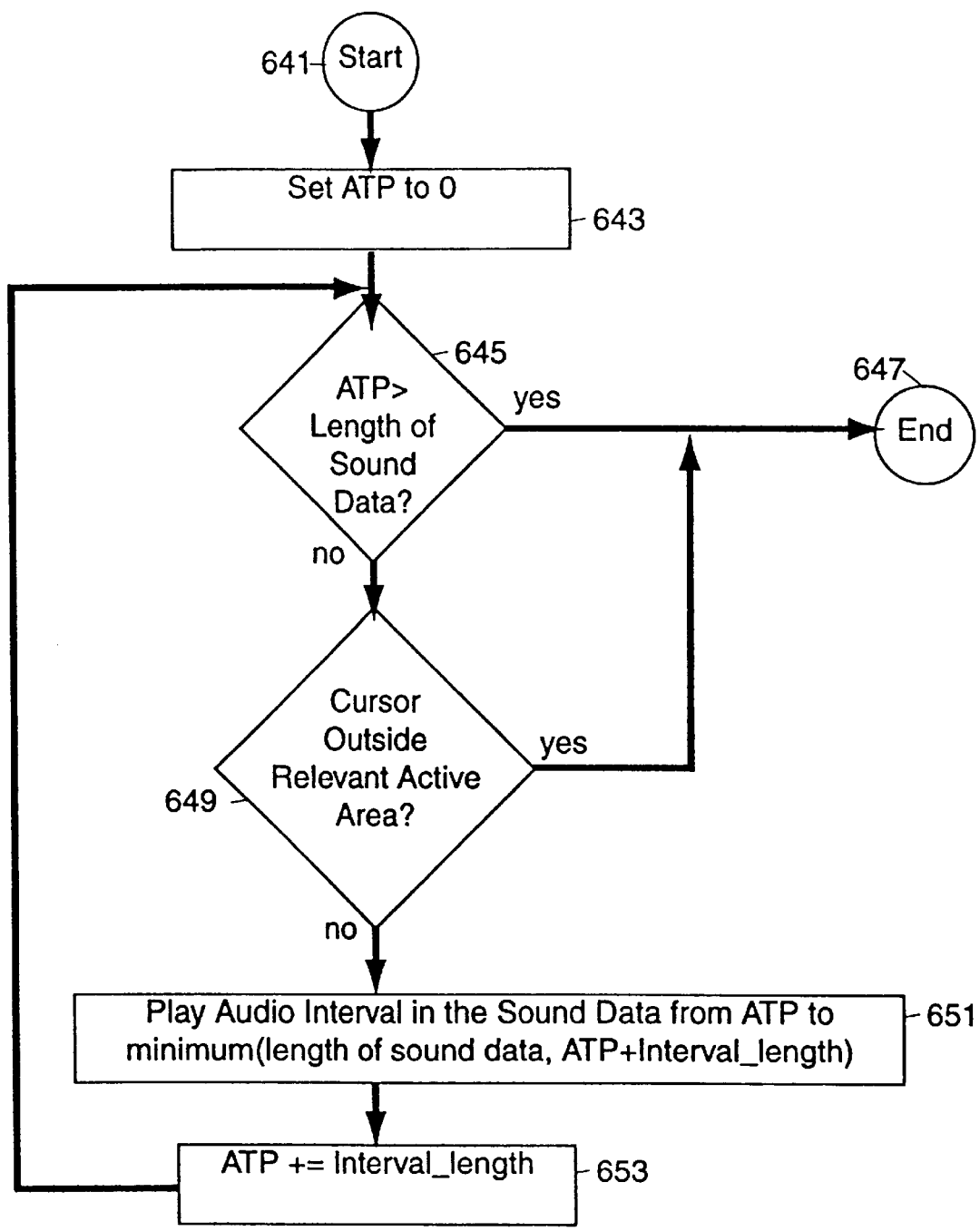
FIG. 6b illustrates the process used to stop presentation of audio messages after moving the cursor off of an area in accordance with a preferred embodiment.

FIG. 6b illustrates the operation of the "Play Sound Data" procedures 505, 619. The process enters through a "Start" terminal 641. The process continues to a calculation procedure 643 that initializes an Audio_time_pointer (ATP) to zero. Next, a decision procedure 645 determines whether the ATP is greater than the length of the sound data being played. If the ATP is greater than the length of the sound data being played, the process completes through an "End" terminal 647. Otherwise, the process continues to a decision procedure 649 that determines whether the cursor has moved outside the relevant active area. If the cursor has moved outside the relevant active area (generally in response to a user's manipulation of a control) the process completes through the "End" terminal 647. If the cursor is still within the relevant active area, the process continues to an operation step 651 that plays the next interval of sound. Then, the process continues to a calculation procedure 653 that advances the ATP to the next sound interval, and the process repeats back to the decision block 645.

Displaying and Labeling Image Map Areas

Figure 7:
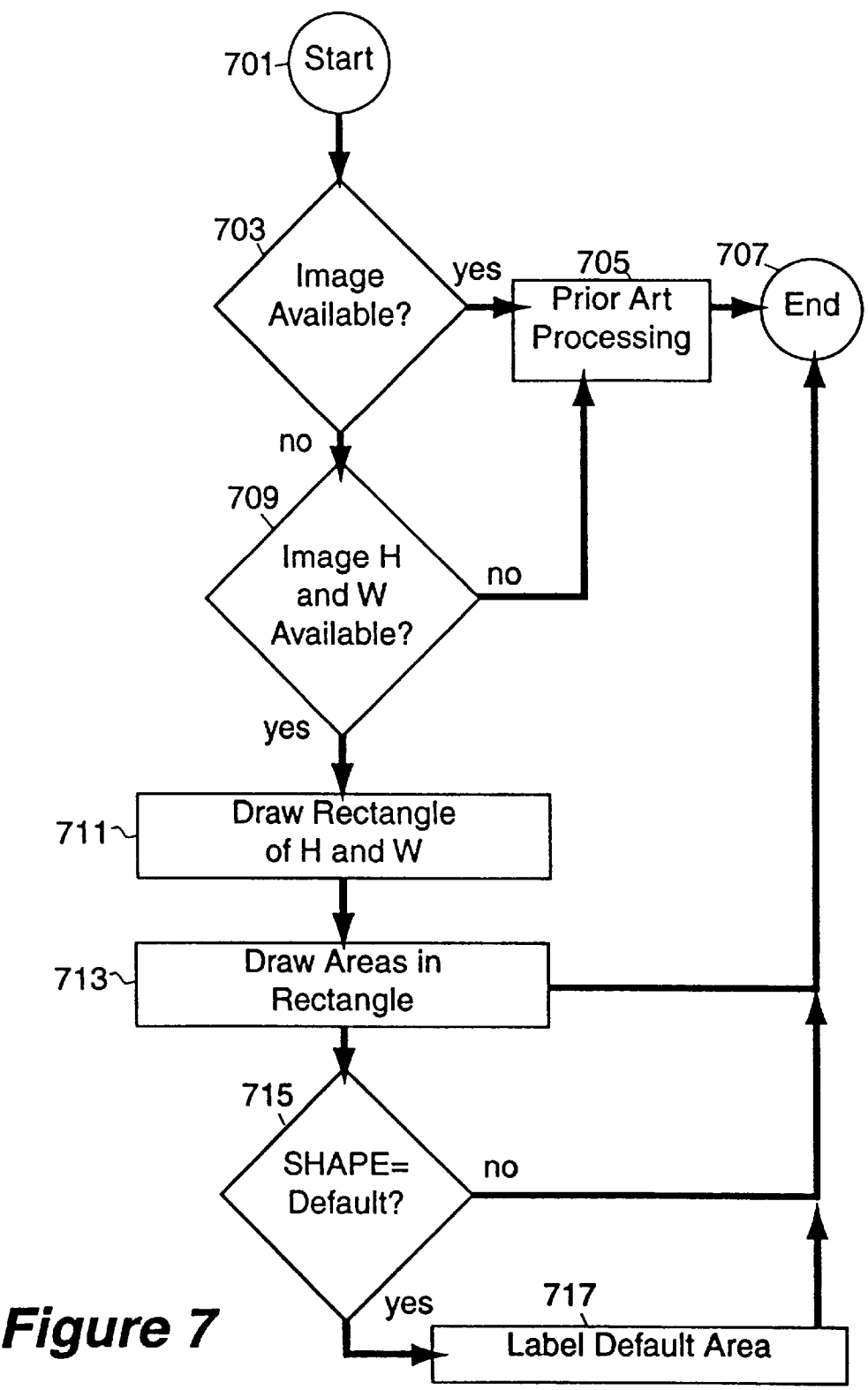
FIG. 7 illustrates the process used to display the active areas defined by an image map in accordance with a preferred embodiment.

FIG. 7 illustrates an additional improvement to the client-side image map. A preferred embodiment of the invention displays the SCAs that are defined by an image map when the actual image is not able to be displayed.

This capability is invoked by the WWW browser program when it retrieves image information. The process initiates at a "Start" terminal 701 and continues to an "Image Available" decision procedure 703. This procedure 703 detects if the image associated with the image map is available. The image is available if the browser has received it; it is not available if the image was not found, if the user disabled image downloading, if the user aborted the image download, or for other reasons. If the image is available it is processed using a "Prior Art Processing" procedure 705 and displayed to the user. Then the process completes through an "End" terminal 707.

If the image is not available at the "Image Available" decision block 703, the process continues to an "Image H and W Available" procedure 709 that determines whether the HEIGHT and WIDTH attributes of the image reference are present. If these attributes are not present, the reference is processed using the "Prior Art Processing" procedure 705 and displays a missing image icon to the user. Then the process completes through the "End" terminal 707.

However, if the "Image H and W Available" procedure 709 determines that the HEIGHT and WIDTH attributes are present, the process continues to a "Draw Rectangle of H and W" process 711 that determines the color of the rectangle and presents the rectangle on the display as described below for FIG. 8. After the rectangle is drawn, the process continues to a "Draw Areas in Rectangle" procedure 713. This procedure 713 colors, draws, and labels the areas within the rectangle that are defined by the <AREA> elements in the image map. This process is further described in FIG. 10.

The process, at a "SHAPE=Default" decision procedure 715 then determines whether the image map contains a SHAPE attribute set to "default". If the image map does not include this attribute, the process completes through the "End" terminal 707. If the decision procedure 715 detects the default shape attribute, the process continues to a "Label Default Area" procedure 717 that labels the default area in some circumstances. This procedure 717 is further described in FIG. 9. The process completes through the "End" terminal 707.

Figure 8:
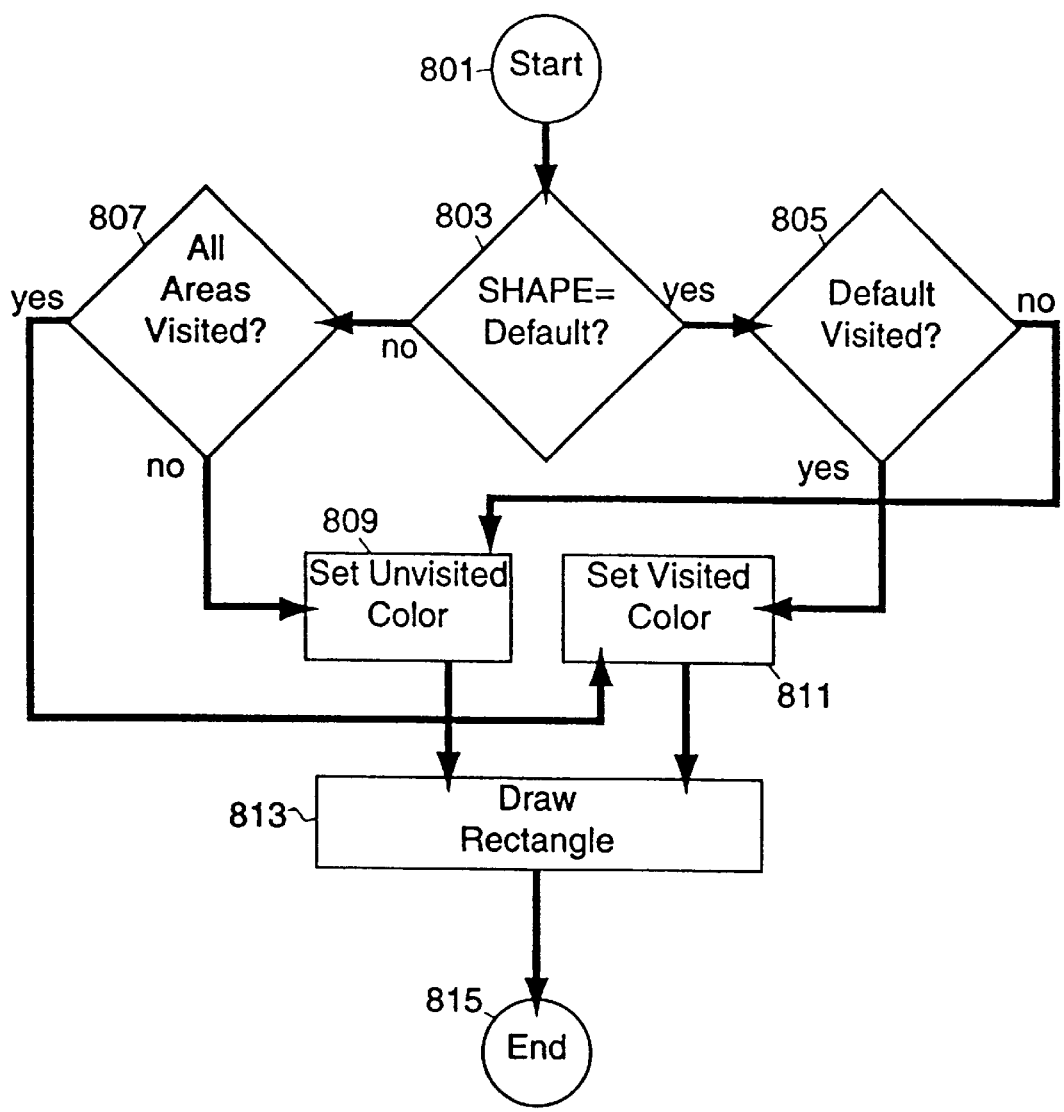
FIG. 8 illustrates the process used to draw a rectangle indicating the extent of an unavailable image in accordance with a preferred embodiment.

FIG. 8 illustrates the process used to draw a rectangle indicating the extent of the unavailable image. The process begins at a "Start" terminal 801 and continues to a "SHAPE=Default" decision procedure 803. This procedure 803 determines whether the HTML markup for the image map includes an <AREA> element that specifies a default. If the procedure 803 determines that such a specification exists, the process continues to a "Default Visited" decision block 805. If the "SHAPE=Default" decision procedure 803 determines that none of the <AREA> elements in the image map specify a default, the process continues to a "All Areas Visited" decision procedure 807.

The "Default Visited" decision procedure 805 determines whether the link specified by the default has been visited. This determination is accomplished by examining a data base of previously visited links as is known in the art. If the link does not exist in the database, the process continues to a "Set Unvisited Color" procedure 809 that conditions the process to draw using the color selected to display hyperlinks that have not been visited. If the link exists in the database, the process continues to a "Set Visited Color" procedure 811 that conditions the process to draw using the visited hyperlink color.

The "All Area Visited" decision procedure 807 examines a data base of previously visited links as is known in the art. If at least one of the links specified in an <AREA> element has not been visited, the process continues to the "Set Unvisited Color" procedure 809 that conditions the process to draw using the color selected to display hyperlinks that have not been visited. However, if all the links specified in <AREA> elements contained within the <MAP> element have been visited, then the process continues to the "Set Visited Color" procedure 811 that conditions the process to draw using the visited hyperlink color.

Regardless of which color is set by these procedures 809, 811, the process continues to a "Draw Rectangle" procedure 813 that draws a rectangle of the specified color around the area that would have been occupied by the missing image. Finally, the process completes through an "End" terminal 815. The above process displays a colored rectangle the size of the missing image that indicates the access status of the attached link(s) in the same manner as the status of standard hyperlinks are displayed. One skilled in the art will understand that the same method can be used to place a border around an image if the image is available.

Figure 9:
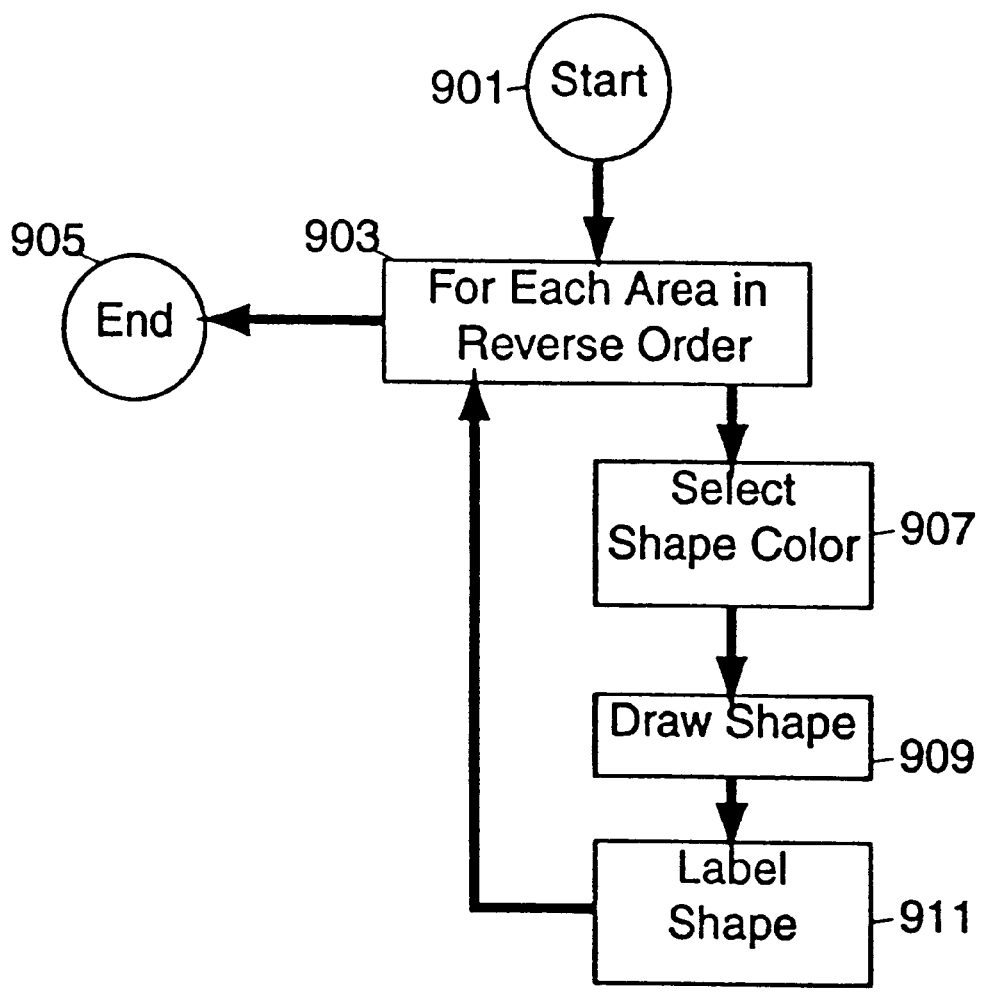
FIG. 9 illustrates the process for drawing and labeling the areas within the rectangle in accordance with a preferred embodiment.

FIG. 9 illustrates the process for drawing and labeling the areas within the rectangle drawn in accordance to the process described for FIG. 8. The following describes a preferred embodiment of the "Draw Areas in Rectangle" procedure 713 of FIG. 7. The process begins at a "Start" terminal 901 and continues to an iterative procedure 903 that iterates over the <AREA> elements defined in the image map in reverse order. Thus, the first defined <AREA> element will be drawn last and will possibly overlap previously drawn <AREA> elements. After all <AREA> elements associated with the image map are displayed, the process completes through an "End" terminal 905.

For each <AREA> element in the image map, at a "Select Shape Color" procedure 907, the process first selects a color for the shape representing the <AREA> element. If the link associated with the <AREA> element has been previously visited (thus the link exists in the previously visited database), the shape color is that of a previously visited hyperlink. If the link has not been previously visited (that is, that the link does not exist in the previously visited database), the shape color is that of a hyperlink that has not been visited.

Next, at a "Draw Shape" procedure 909, the process draws a shape as specified by the SHAPE attribute of the <AREA> element. If the <AREA> element does not provide a SHAPE attribute, the default shape defined in the client-side image map specification is used. A preferred embodiment supports the standard shapes defined in the image map specification (RECT, CIRCLE, RECTANGLE, and POLYGON). The shape of the <AREA> elements are drawn such that they are clipped to the enclosing rectangle representing the missing image.

A "Label Shape" procedure 911 then labels, using the selected color, the shape drawn by the "Draw Shape" procedure 909. The label used is the name of the destination of the link. The name of the destination is defined to be the string defined by the ALT attribute of the <AREA> element if available. If the ALT attribute is not defined, the name is the URL that defines the link. The name text is centered at the geometric center of the shape and printed in one line (if possible) within the width of the shape. If required, the name text is word-wrapped to fit within the shape. The font size of the name text is reduced if the name text does not fit within the shape. If, at the smallest acceptable font size, the name text still does not fit, the process reduces the amount of text displayed. If the name was defined by an ALT attribute, the string is truncated leaving some number of the beginning characters of the name. If the name is a URL, the initial characters of the string are removed leaving only the last part of the URL as the displayed name. The label position and size are further adjusted to avoid other areas that overlap the area containing the label.

The above described processes are then applied to the next <AREA> element in the image map at the procedure 903.

Figure 10:
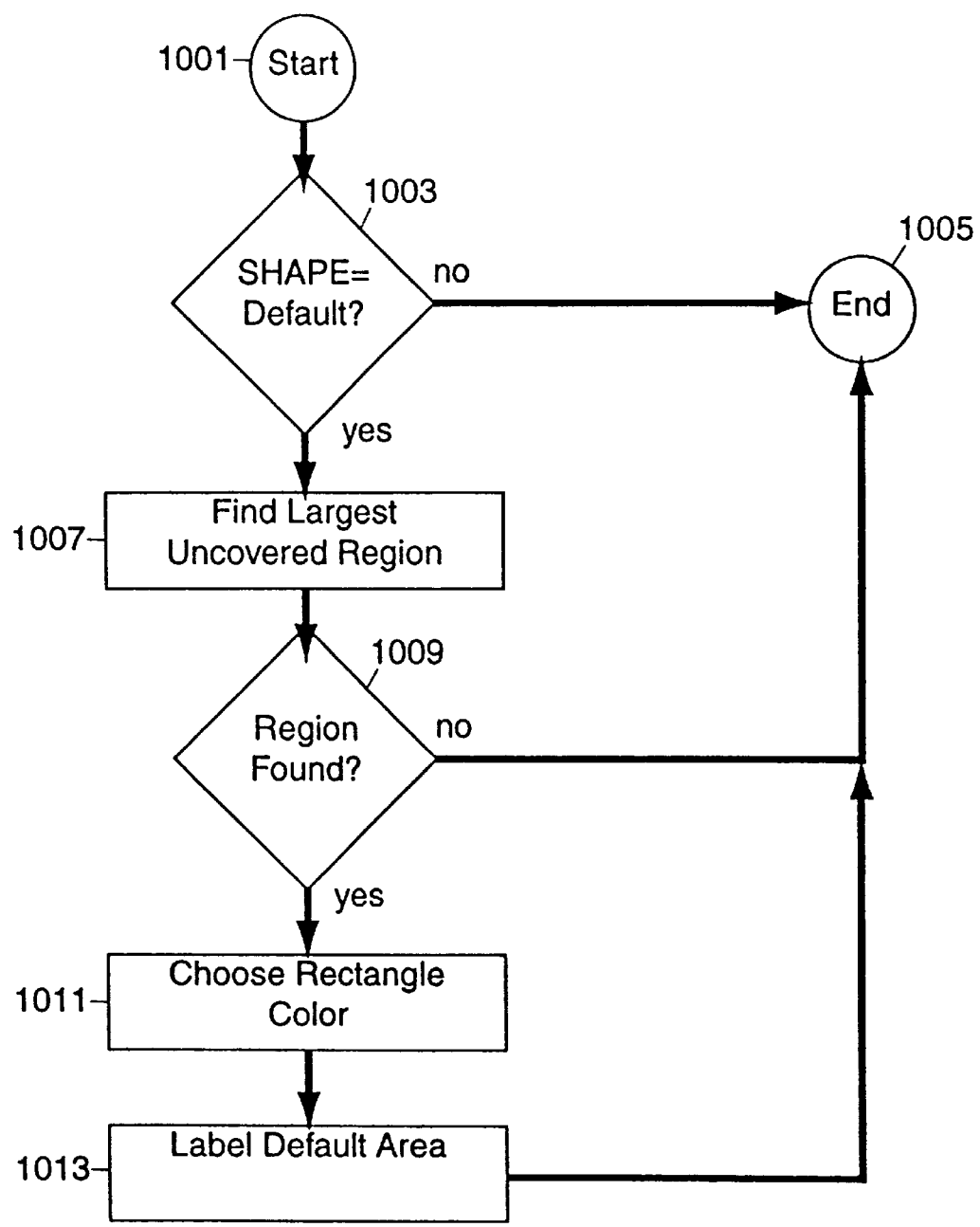
FIG. 10 illustrates the process used to label the default area in the image map in accordance with a preferred embodiment.

FIG. 10 illustrates the process used to implement the "Label Default Area" procedure 717 of FIG. 7. The process enters through a "Start" terminal 1001 and continues to a "SHAPE=Default" decision procedure 1003. If the <MAP> element does not contain an <AREA> element with the SHAPE attribute set to default, the process completes through an "End" terminal 1005. Otherwise, the process continues to a "Find Largest Uncovered Region" procedure 1007. The goal of this procedure 1007 is to determine the largest area in the rectangle that is available for a label. To find this area, the procedure 1007 removes the area of the regions defined by the <AREA> elements of the image map from the area contained within the rectangle. This procedure 1007 then determines the largest uncovered area remaining in the rectangle. If two remaining uncovered areas are of similar size, one is picked. At a "Region Found" decision procedure 1009, the process checks whether a suitable uncovered region was found by the procedure 1007. If no suitable region was found, the process completes through the "End" terminal 1005 without having labeled the default area. However, at the decision block 1009, if a suitable region is found, the process continues to a "Choose Rectangle Color" procedure 1011. This procedure 1011 chooses a color for the text relating to the status of the link associated with the <AREA> element containing the SHAPE attribute equal to default. If this link has been previously visited (thus the link exists in the previously visited database), the label color is that of a previously visited hyperlink. If the link has not been previously visited (that is, that the link does not exist in the previously visited database), the label color is that of an unvisited hyperlink.

Next, the process continues to a "Label Default Area" procedure 1013 that displays a label, using the selected color, in the uncovered region found by the procedure 1007. The label used is the name of the destination of the link. The name of the destination is defined to be the string defined by the ALT attribute of the <AREA> element (with the SHAPE attribute equal to default) if available. If the ALT attribute is not defined, the name is the URL that defines the link. The name text is centered at the geometric center of the region found by the procedure 1007 and printed in one line (if possible) within the width of the region. If required, the name text is word-wrapped to fit within the region. The font size of the name text is reduced if the name text does not fit within the region. If, at the smallest acceptable font size, the name text still does not fit the process reduces the amount of text displayed. If the name was defined by an ALT attribute, the string is truncated leaving some number of the beginning characters of the name. If the name is a URL, the initial characters of the string are removed leaving only the last part of the URL as the displayed label.

After completion of the "Label Default Area" procedure 1013, the process completes through the "End" terminal 1005.

Figure 1B:
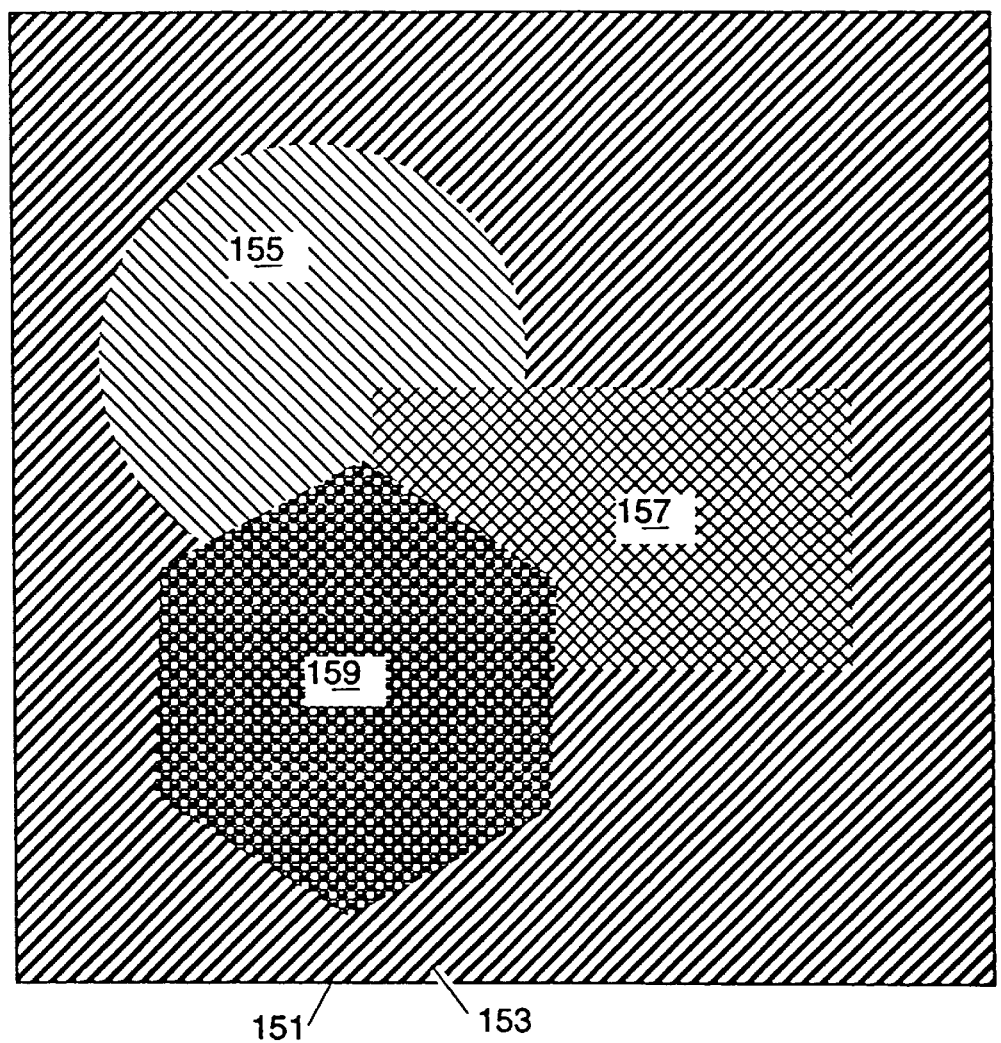
FIG. 1b illustrates a web page display using a mapped image to indicate hyperlinks to other information.
Figure 11:
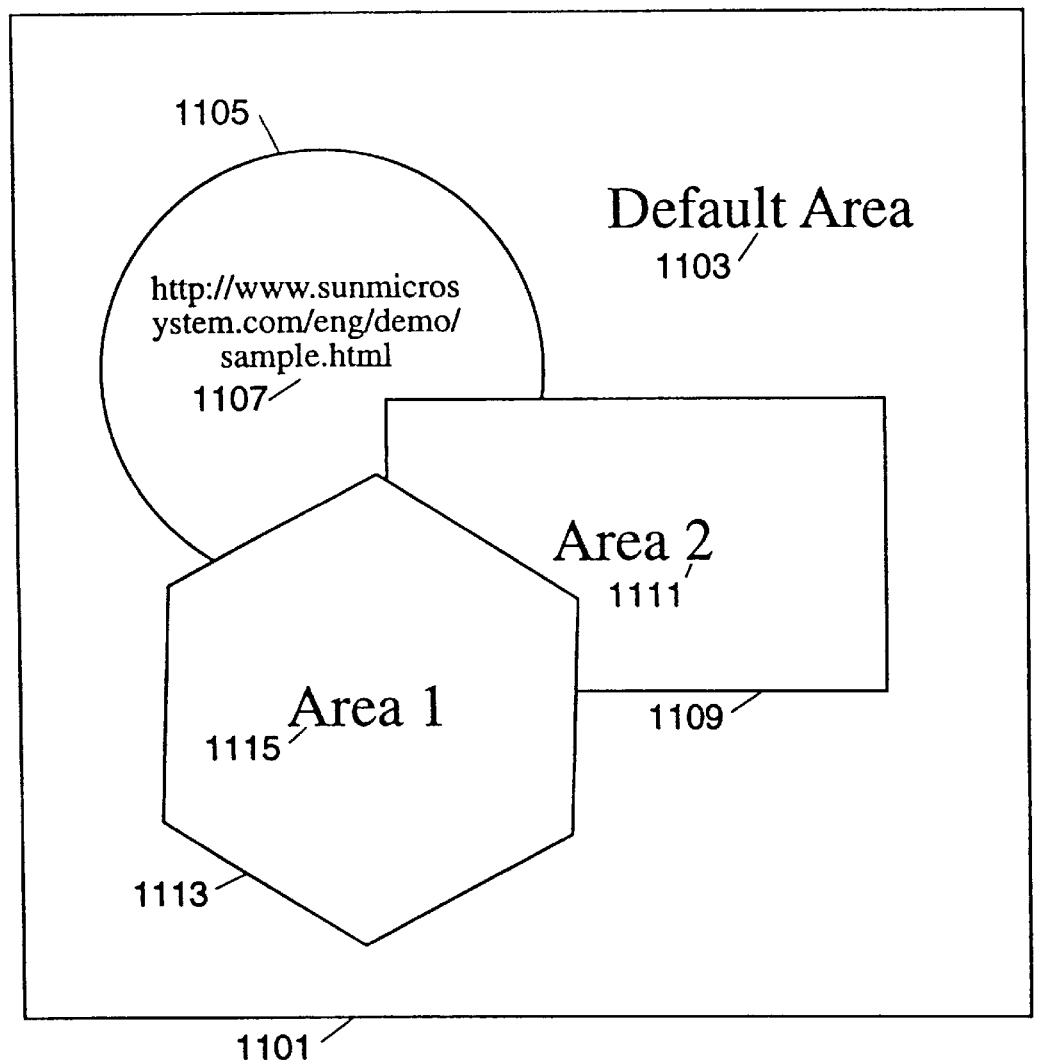
FIG. 11 illustrates the resultant display of the areas in the rectangle in accordance with a preferred embodiment.

FIG. 11 illustrates the resultant display of the invention on the client-side image map of FIG. 1b when the image data is not available. The HTML markup to create this image map is listed in Table 3.

TABLE 3

```
<MAP NAME="nav2bar">
<AREA SHAPE="POLY" COORDS="144, 187, 224, 236, 221, 332,
       137, 377, 56, 326, 60, 231, 144, 187"
    HREF="http://www.sun.com/"
    ALT="Area 1">
<AREA SHAPE="RECT" COORDS="148,156,348,247"
    HREF="/current/columns/alertbox"
    ALT="Area 2">
<AREA SHAPE="CIRCLE" COORDS="123,144,89"
    HREF="http://www.sunmicrosystem.com/eng/demo/sample.html">
<AREA SHAPE="DEFAULT"
    HREF="/index.html"
    ALT="Default Area">
</MAP>
<IMG SRC="/share/images/nav2bar.gif" WIDTH=405 HEIGHT=405
    USEMAP="#nav2bar">
```

A rectangle 1101 is created from the HEIGHT and WIDTH attributes in the <IMG> element of Table 3. The default area is labeled by a string 1103 drawn in an open area of the rectangle 1101. A circle area 1105 is labeled with the trailing portion of the URL specified in the <AREA> element defining the circle area 1105 and results in a text label 1107 that identifies the file that is invoked by activation of the circle area 1105. A rectangular area 1109 is labeled by an "Area 2" string 1111 as defined by the ALT attribute in the associated <AREA> element of Table 3. Finally, a polygon area 1113, is labeled with an "Area 1" string 1115 defined by the ALT attribute in associated the <AREA> element.

One skilled in the art will understand that the invention as described above teaches enhancements to HTML client-side image maps. These enhancements assist the visually impaired in accessing hyperlinks associated with areas in the image map. These enhancements also show the areas defined by the image map when the image itself is not available.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for enhancing human-computer interactions comprising steps of:

(a) detecting, from a page layout description an image map which identifies at least one selectable area of an image, said image map having an audio attribute associated with said selectable area;

(b) detecting a preselection condition on said selectable area within said image; and (c) presenting a first sound associated with said audio attribute through a sound production facility.

2. The computer controlled method of claim 1 wherein step (b) further comprises:

(b1) detecting a hit condition on a relevant active area of said image; and (b2) detecting existence of said hit condition for longer than a predetermined period of time.

3. The computer controlled method of claim 2 wherein said hit condition exists when activation of a cursor will cause selection of said relevant active area.

4. The computer controlled method of claim 1 wherein said audio attribute is a string defined within said image map.

5. The computer controlled method of claim 4 wherein step (c) further comprises processing said string by a speech synthesis facility to create said first sound representing said string through said sound production facility.

6. The computer controlled method of claim 1 wherein said audio attribute is a reference to sound data, said reference defined within said image map.

7. The computer controlled method of claim 6 wherein step (c) further comprises playing said sound data using said sound production facility to create said first sound.

8. The computer controlled method of claim 6 wherein step (a) further comprises loading said sound data into a memory using said reference.

9. The computer controlled method of claim 8 wherein step (c) further comprises:

(c1) detecting unavailability of said sound data in said memory; and (c2) presenting an error sound through said sound production facility.

10. The computer controlled method of claim 9 wherein step (c) further comprises:

(c3) detecting availability of said sound data in said memory;

(c4) terminating presentation of said error sound; and (c5) playing said sound data through said sound production facility to create said first sound.

11. An information display system for enhancing human-computer interactions comprising:

an image map detection mechanism configured to detect, from a page layout description, an image map which identifies at least one selectable area of an image, said image map having an audio attribute associated with said selectable area;

a preselection condition detection mechanism configured to detect a preselection condition on said selectable area within said image; and a sound presentation mechanism configured to present a first sound associated with said audio attribute through a sound production facility upon detection of said preselection condition.

12. The information display system of claim 11 wherein the preselection condition detection mechanism further comprises:

a hit detection mechanism configured to detect a hit condition on a relevant active area of said image; and a delay completion mechanism configured to detect existence of said hit condition for longer than a predetermined period of time.

13. The information display system of claim 12 wherein said hit condition exists when activation of a cursor will cause selection of said relevant active area.

14. The information display system of claim 11 wherein said audio attribute is a string defined within said image map.

15. The information display system of claim 14 wherein the sound presentation mechanism further comprises a speech synthesis facility mechanism configured to process said string to create said first sound.

16. The information display system of claim 11 wherein said audio attribute is a reference to sound data, said reference defined within said image map.

17. The information display system of claim 16 wherein the sound presentation mechanism further comprises a play mechanism configured to play said sound data using said sound production facility to create said first sound.

18. The information display system of claim 16 wherein the image map detection mechanism further comprises a load mechanism configured to load said sound data into a memory using said reference.

19. The information display system of claim 18 wherein the sound presentation mechanism further comprises an error sound presentation mechanism configured to present an error sound through said sound production facility if said sound data in said memory is unavailable after a period of time.

20. The information display system of claim 19 wherein the sound presentation mechanism further comprises:
  a sound load complete detection mechanism configured to detect availability of said sound data in said memory;
  an error sound termination mechanism configured to terminate presentation of said error sound; and
  a sound playback mechanism configured to play said sound data through said sound production facility to create said first sound.

21. An information display apparatus for enhancing human-computer interactions having a central processing unit (CPU), a memory, and comprising:
  an image map detection mechanism configured to detect, from a page layout description, an image map which identifies at least one selectable area of an image, said image map having an audio attribute associated with said selectable area;
  a preselection condition detection mechanism configured to detect a preselection condition on said selectable area within said image; and
  a sound presentation mechanism configured to present a first sound associated with said audio attribute through a sound production facility upon detection of said preselection condition.

22. The information display apparatus of claim 21 wherein the preselection condition detection mechanism further comprises:
  a hit detection mechanism configured to detect a hit condition on a relevant active area of said image; and
  a delay completion mechanism configured to detect existence of said hit condition for longer than a sufficient period of time.

23. The information display apparatus of claim 22 wherein said hit condition exists when activation of a cursor will cause selection of said relevant active area.

24. The information display apparatus of claim 21 wherein said audio attribute is a string defined within said image map.

25. The information display apparatus of claim 24 wherein the sound presentation mechanism further comprises a speech synthesis facility mechanism configured to process said string to create said first sound.

26. The information display apparatus of claim 21 wherein said audio attribute is a reference to sound data, said reference defined within said image map.

27. The information display apparatus of claim 26 wherein the sound presentation mechanism further comprises a play mechanism configured to play said sound data using said sound production facility to create said first sound.

28. The information display apparatus of claim 26 wherein the image map detection mechanism further comprises a load mechanism configured to load said sound data into said memory using said reference.

29. The information display apparatus of claim 28 wherein the sound presentation mechanism further comprises an error sound presentation mechanism configured to present an error sound through said sound production facility if said sound data in said memory is unavailable after a period of time.

30. The information display apparatus of claim 29 wherein the sound presentation mechanism further comprises:
  a sound load complete detection mechanism configured to detect availability of said sound data in said memory;
  an error sound termination mechanism configured to terminate presentation of said error sound; and
  a sound playback mechanism configured to play said sound data through said sound production facility to create said first sound.

31. A computer program product comprising:
  a computer usable storage medium;
  computer controlling instructions, stored on said storage medium, providing an image map detection mechanism configured to detect an image map which identifies at least one selectable area of an image, said image map having an audio attribute associated with said selectable area;
  computer controlling instructions, stored on said storage medium, providing a preselection condition detection mechanism configured to detect a preselection condition on said selectable area within said image; and
  computer controlling instructions, stored on said storage medium, providing a sound presentation mechanism configured to present a first sound associated with said audio attribute through a sound production facility upon detection of said preselection condition.

32. The computer program product of claim 31 wherein the preselection condition detection mechanism further comprises:
  a hit detection mechanism configured to detect a hit condition on a relevant active area of said image; and
  a delay completion mechanism configured to detect existence of said hit condition for longer than a predetermined period of time.

33. The computer program product of claim 32 wherein said hit condition exists when activation of a cursor will cause selection of said relevant active area.

34. The computer program product of claim 31 wherein said audio attribute is a string defined within said image map.

35. The computer program product of claim 34 wherein the sound presentation mechanism further comprises a speech synthesis facility mechanism configured to process said string to create said first sound.

36. The computer program product of claim 31 wherein said audio attribute is a reference to sound data, said reference defined within said image map.

37. The computer program product of claim 36 wherein the sound presentation mechanism further comprises a play mechanism configured to play said sound data using said sound production facility to create said first sound.

38. The computer program product of claim 36 wherein the image map detection mechanism further comprises a load mechanism configured to load said sound data into a computer memory using said reference.

39. The computer program product of claim 38 wherein the sound presentation mechanism further comprises an error sound presentation mechanism configured to present an error sound through said sound production facility if said sound data in said memory is unavailable after a period of time.

40. The computer program product of claim 39 wherein the sound presentation mechanism further comprises:
   a sound load complete detection mechanism configured to detect availability of said sound data in said memory;
   an error sound termination mechanism configured to terminate presentation of said error sound; and
   a sound playback mechanism configured to play said sound data through said sound production facility to create said first sound.

41. A computer controlled method of enhancing human-computer interactions, said method comprising steps of:
   (a) detecting in a page layout an image map which identifies at least one selectable area of an image;
   (b) detecting in said page layout a height attribute and a width attribute for an image area; and
   (c) displaying a border around said image area when said image is not available, said border having a first status representation.

42. The computer controlled method of claim 41 wherein said selectable area is a default area having a link and said first status representation is a color that indicates whether said link has been visited.

43. The computer controlled method of claim 41 wherein said image map does not include a default area element and first status representation is a color that indicates whether a link defined in said at least one selectable area has not been visited.

44. The computer controlled method of claim 41 further comprising:
   (d) displaying in said image area said at least one selectable area having a second status representation, said at least one selectable area having a link.

45. The computer controlled method of claim 44 wherein said second status representation is a color that indicates whether said link has been visited.

46. An information display system for enhancing human-computer interactions, said system comprising:
   an image map detection mechanism configured to detect in a page layout an image map which identifies at least one selectable area of an image;
   an image size detection mechanism configured to detect in said page layout a height attribute and a width attribute for an image area; and
   a border display mechanism configured to display a border around said image area when said image is not available, said border having a first status representation.

47. The information display system of claim 46 wherein said selectable area is a default area having a link and said first status representation is a color that indicates whether said link has been visited.

48. The information display system of claim 46 wherein said image map does not include a default area element and first status representation is a color that indicates whether a link defined in said at least one selectable area has not been visited.

49. The information display system of claim 46 further comprising a display mechanism configured to display in said image area said at least one selectable area having a second status representation, said at least one selectable area having a link.

50. The information display system of claim 49 wherein said second status representation is a color that indicates whether said link has been visited.

51. An information display apparatus for enhancing human-computer interactions, said apparatus having a central processing unit (CPU), a memory, and comprising:
   an image map detection mechanism configured to detect in a page layout an image map which identifies at least one selectable area of an image;
   an image size detection mechanism configured to detect in said page layout a height attribute and a width attribute for an image area; and
   a border display mechanism configured to display a border around said image area when said image is not available, said border having a first status representation.

52. The information display apparatus of claim 51 wherein said selectable area is a default area having a link and said first status representation is a color that indicates whether said link has been visited.

53. The information display apparatus of claim 51 wherein said image map does not include a default area element and first status representation is a color that indicates whether a link defined in said at least one selectable area has not been visited.

54. The information display apparatus of claim 51 further comprising a display mechanism configured to display in said image area said at least one selectable area having a second status representation, said at least one selectable area having a link.

55. The information display apparatus of claim 54 wherein said second status representation is a color that indicates whether said link has been visited.

56. A computer program product comprising:
   a computer usable storage medium;
   computer controlling instructions, stored on said storage medium, providing an image map detection mechanism configured to detect in a page layout an image map which identifies at least one selectable area of an image;
   computer controlling instructions, stored on said storage medium, providing an image size detection mechanism configured to detect in said page layout a height attribute and a width attribute for an image area of said image; and
   computer controlling instructions, stored on said storage medium, providing a border display mechanism configured to display a border around said image area when said image is not available, said border having a first status representation.

57. The computer program product of claim 56 wherein said selectable area is a default area having a link and said first status representation is a color that indicates whether said link has been visited.

58. The computer program product of claim 56 wherein said image map does not include a default area element and first status representation is a color that indicates whether a link defined in said at least one selectable area has not been visited.

59. The computer program product of claim 56 further comprising:

computer controlling instructions, stored on said storage medium, providing a display mechanism configured to display in said image area said at least one selectable area having a second status representation, said at least one selectable area having a link.

60. The computer program product of claim 59 wherein said second status representation is a color that indicates whether said link has been visited.

* * * * *